United States Patent [19]

Allegrucci et al.

[11] Patent Number: 5,428,779
[45] Date of Patent: Jun. 27, 1995

[54] SYSTEM AND METHOD FOR SUPPORTING CONTEXT SWITCHING WITHIN A MULTIPROCESSOR SYSTEM HAVING FUNCTIONAL BLOCKS THAT GENERATE STATE PROGRAMS WITH CODED REGISTER LOAD INSTRUCTIONS

[75] Inventors: Jean D. Allegrucci, Mountain View; Derek J. Lentz, Los Gatos; Glenn C. Poole, Fremont, all of Calif.

[73] Assignee: Seiko Epson Corporation, Tokyo, Japan

[21] Appl. No.: 973,344

[22] Filed: Nov. 9, 1992

[51] Int. Cl.⁶ .............................................. G06F 9/46
[52] U.S. Cl. ..................................... 395/650; 364/230
[58] Field of Search ................. 395/650; 364/DIG. 1, 364/DIG. 2

[56] References Cited

U.S. PATENT DOCUMENTS

| | | | |
|---|---|---|---|
| 3,614,742 | 10/1971 | Watson et al. | 340/172.5 |
| 4,067,058 | 1/1978 | Brandstaether et al. | 364/200 |
| 4,445,173 | 4/1984 | Pilat et al. | 364/200 |
| 4,562,538 | 12/1985 | Berenbaum | 364/200 |
| 4,658,351 | 4/1987 | Teng | 364/200 |
| 5,008,812 | 4/1991 | Bhandarkar et al. | 364/200 |
| 5,127,098 | 6/1992 | Rosenthal et al. | 395/650 |
| 5,142,677 | 8/1992 | Ehlig et al. | 395/650 |

OTHER PUBLICATIONS

"High-Speed Multi-Programming Data Structure", IBM Tech. Disclosure Bulletin, vol. 29 No. 2 Jul. 1986, p. 947.

Draves et al., "Using Continuations to Implement Thread Management and Communication in Operating Systems", *Operating Systems Review* (SIGOPS), vol. 25, No. 5, Oct. 1991, pp. 122–136.

Hieb et al., "Continuations and Concurrency", Proceedings of the Second ACM SIGPLAN Symposium on Principles & Practice of Parallel Programming, Seattle, Wash., Mar. 14–16, 1990, pp. 128–136.

Dybvig et al., "Engines from Continuations", *Computer Langauges*, vol. 14, 1989, pp. 109–123.

*Primary Examiner*—Kevin A. Kriess
*Assistant Examiner*—Matthew M. Payne
*Attorney, Agent, or Firm*—Sterne, Kessler, Goldstein & Fox

[57] ABSTRACT

A context switching system for saving, restoring or swapping tasks, and is adapted for use in a multitasking processor coupled to an external or system memory. The processor includes one or more functional blocks to perform the tasks. The functional blocks comprise registers that store state data that, at a particular instant, represents the context of the system. The system comprises a controller that receives a save or switch command and generates a context save instruction in response thereto. The controller is configured to pass the context save instruction to the functional blocks. The functional blocks generate a state program. The state program comprises one or more register load instructions and the state data representing the context of the system so that context can be restored at a later time. The state program is stored in an external or system memory. Saving context as state programs permits the system to quickly switch from one context to another without losing important information.

4 Claims, 4 Drawing Sheets

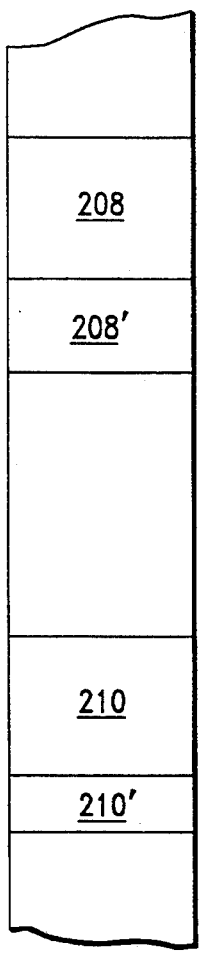
FIG.—2B
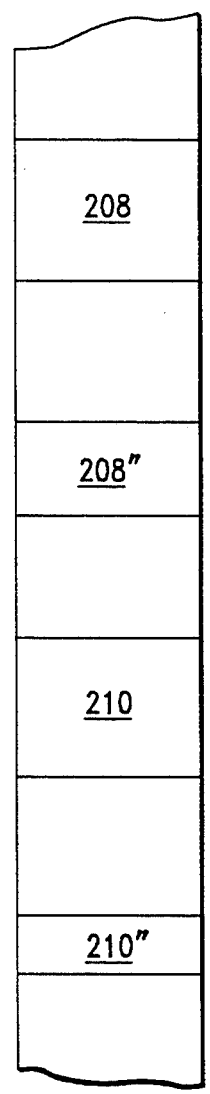
FIG.—2C
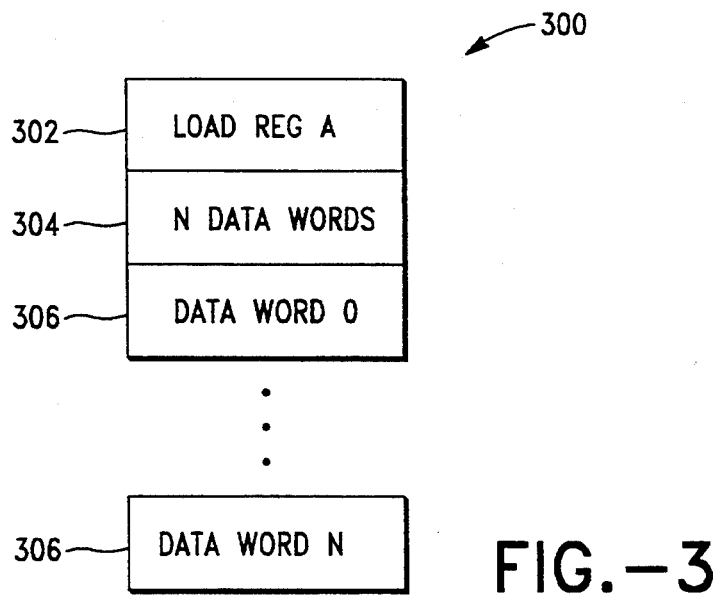
FIG.—3

SYSTEM AND METHOD FOR SUPPORTING CONTEXT SWITCHING WITHIN A MULTIPROCESSOR SYSTEM HAVING FUNCTIONAL BLOCKS THAT GENERATE STATE PROGRAMS WITH CODED REGISTER LOAD INSTRUCTIONS

CROSS-REFERENCE TO RELATED APPLICATIONS

The following is a commonly owned, co-pending application: "Virtual FIFO Peripherals Interface", Ser. No. 07/862,623, filed Mar. 31, 1992. The disclosure of the above application is incorporated herein by reference.

BACKGROUND OF THE INVENTION

1. Field of the Invention

The present invention relates to digital processors, and more particularly, the present invention relates to a system and method for transferring digital processor internal state data, called context, to and from system memory.

2. Related Art

Digital processors, like general purpose microprocessors as well as custom processors, have internal memories and registers which are used extensively during the processing of any kind of task. The content of these registers at any given instant can be interpreted as the current state of the processor.

In a book titled, *VLSI RISC Architecture and Organization*, (Marcel Dekker, Inc., 1989), Stephen B. Furber discusses the development of multitasking computers. The following includes a summary of his discussion.

Until recently computers have been expensive, and the pressure to make best use of their capabilities has been intense. Running only one program at a time is inefficient. This is because that program may only require a small fraction of the available memory, and the central processing unit (CPU) is idle for long periods while it waits for information from a disk. If there are two programs resident, the CPU can work on one until a disk transfer is required, then switch to the other while the transfer takes place, and then switch back to the first after the transfer is complete. The CPU is thereby better utilized. In practice, several programs are kept active at any time, and the CPU switches between them according to the availability of data, task priority, etc. This is commonly referred to as "multitasking."

With the advent of the low-cost, moderately powered personal computer (PC) and workstation, multitasking is becoming more commonplace. Rather than loading one machine with tasks from multiple users, a single PC or workstation is often dedicated to perform the multiple tasks of a single user. In this environment, the machine waits until its services are required by the single user. The machine must respond as quickly as possible when called to do something, so as not to keep its user idle.

Multitasking is becoming more popular because the PC is becoming involved in more aspects of its operator's business, and the operator is requiring the PC to perform multiple tasks simultaneously. For example, the operator may like to have multiple documents and spreadsheets visible at the same time, while the machine handles electronic mail in the background, and continues to print the latest report. A multitasking operating system provides the best framework for the implementation of this level of functionality.

As noted, multitasking systems allow several tasks to be processed "simultaneously" by the same processor. In reality, multitasking control software manages the time spent by the processor on each task. The multitasking control software (sometimes called "system software"), interrupts the execution of a current task to allow a new task to be processed, a previous task to complete, or to resume processing. The contents of the processor internal registers describing its current state for the current task are saved in memory by what is called a context save operation. The processor register contents are replaced by the state of the new task to be processed by executing a context restore operation. Resuming the execution of a task is preceded by restoring the state the processor was in prior to the interruption of that task. The system memory, typically external memory, is usually managed by a virtual memory manager.

Thus, multitasking requires two things. First, for flexibility, it must allow a task to be loaded in different parts of system memory, for example, at different times. A processor with a fixed set of tasks loaded at fixed addresses is very inflexible. Second, it must allow tasks to be written without their knowing the amount of memory they will be allocated. The latter condition is most easily satisfied by conventional virtual memory techniques; the former may be satisfied by address translation mechanisms used to implement virtual memory. Using conventional techniques, each task is constructed as though it owned the entire virtual address space, then the address is extended to include a task identifier for translation purposes.

Like virtual memory, support for multitasking is now mandatory on general-purpose computers above the PC level, and it is becoming important on PCs as their processing power approaches that of workstations. Even more advanced reduced instruction set computing (RISC) processors must therefore offer the necessary support if RISC machines are to compete in these market places. This results in additional complexity inside the processor.

These additional complexities and the increased switching due to multitasking brings about the need for an operating system with support for lightweight processes. Thus, the speed of processor context switches becomes more important. In a multitasking graphics processor, for example, conventional context switching systems are much too slow to keep up with the many simultaneous, robust numerical tasks inherent in graphics processing. Therefore, what is desired is a automatic hardware context switching mechanism that can achieve the necessary context switching speed, and thus keep up with multitasking applications.

SUMMARY OF THE INVENTION

The present invention is directed to a system and method for transferring digital processor internal state data or "context", to and from external memory. The transfer of context to external memory is called a "state save operation", and the transfer of context from external memory back to the processor is called a "state restore operation."

The present invention is directed to a hardware implementation of an automatic context switch mechanism (the system) and a method of operation of the same. The system handles fast context switching between as many processes as can be handled by available system memory. The hardware structure and the format in which state data is saved, enable a processor to save its state data regardless of the size of the internal state and functional blocks in the processor.

When a context save, restore, or a context save/restore (also called a context switch) is initiated a direct memory access (DMA) controller signals the system's functional blocks. In response, the functional blocks perform a state save operation by saving the state data into external memory. The DMA then fetches a new state from external memory and forwards it to the functional blocks to perform a state restore operation.

The format in which the state is saved also enables a fast restore of the processor state. The state is saved as a block of data and one or more register load instructions to form a "state program." The state restore operation simply comprises fetching and executing the state program from external memory. The state program is thus read from external memory and executed like a standard program. Saving context as state programs permits the system to quickly switch from one context to another without loosing important information.

The foregoing and other features and advantages of the present invention will be apparent from the following more particular description of the preferred embodiments of the invention, as illustrated in the accompanying drawings.

BRIEF DESCRIPTION OF THE DRAWINGS

The invention will be better understood if reference is made to the accompanying drawings in which:

FIGS. 2A–C are representative illustrations showing a portion of external memory that stores state programs in accordance with the system of FIG. 1.

FIG. 3 shows a state block of the present invention.

In the drawings, like reference numbers indicate identical or functionally similar elements. Additionally, the left-most digit of the reference number identifies the drawing in which the reference number first appears.

DETAILED DESCRIPTION

The present invention is a context switching system and method for saving, restoring and switching tasks. The system is part of a multitasking processor coupled to a external, main or system memory (any memory outside of the multitasking processor; hereafter called memory). The memory can be shared by a plurality of processors. The multitasking processor has one or more functional blocks (sometimes referred to a processing units or modules, or microcoded units), which may be subprocessors or simpler units used to perform specific tasks. The functional blocks include registers that store state data representing the context of the multitasking processor while a particular task is being performed.

The present invention will now be discussed in connection with a VLSI multiprocessing graphics processor chip. However, the present invention can be applied to any system having state data, as will become evident to those skilled in the art. The present invention is therefore not limited to a graphics processor per se. The terms processor, CPU, and digital processor are often used interchangeably in this field. The term "processor" is used hereafter with the understanding that other similar terms could be substituted therefore without changing the underlying meaning of this disclosure.

The terms chip, integrated circuit, semiconductor device and microelectronic device are often used interchangeably in this field. The present invention is applicable to all of the above as they are generally understood in the field.

The processor executes instructions as follows: the program instructions and data are brought in from the memory by an internal direct memory access (DMA) controller, or can be provided directly by an external device. In a preferred embodiment of the present invention, the instructions are loaded in a temporary program queue inside the DMA. The DMA executes local instructions, or passes other instructions and data to the functional blocks for processing.

Figure 1:
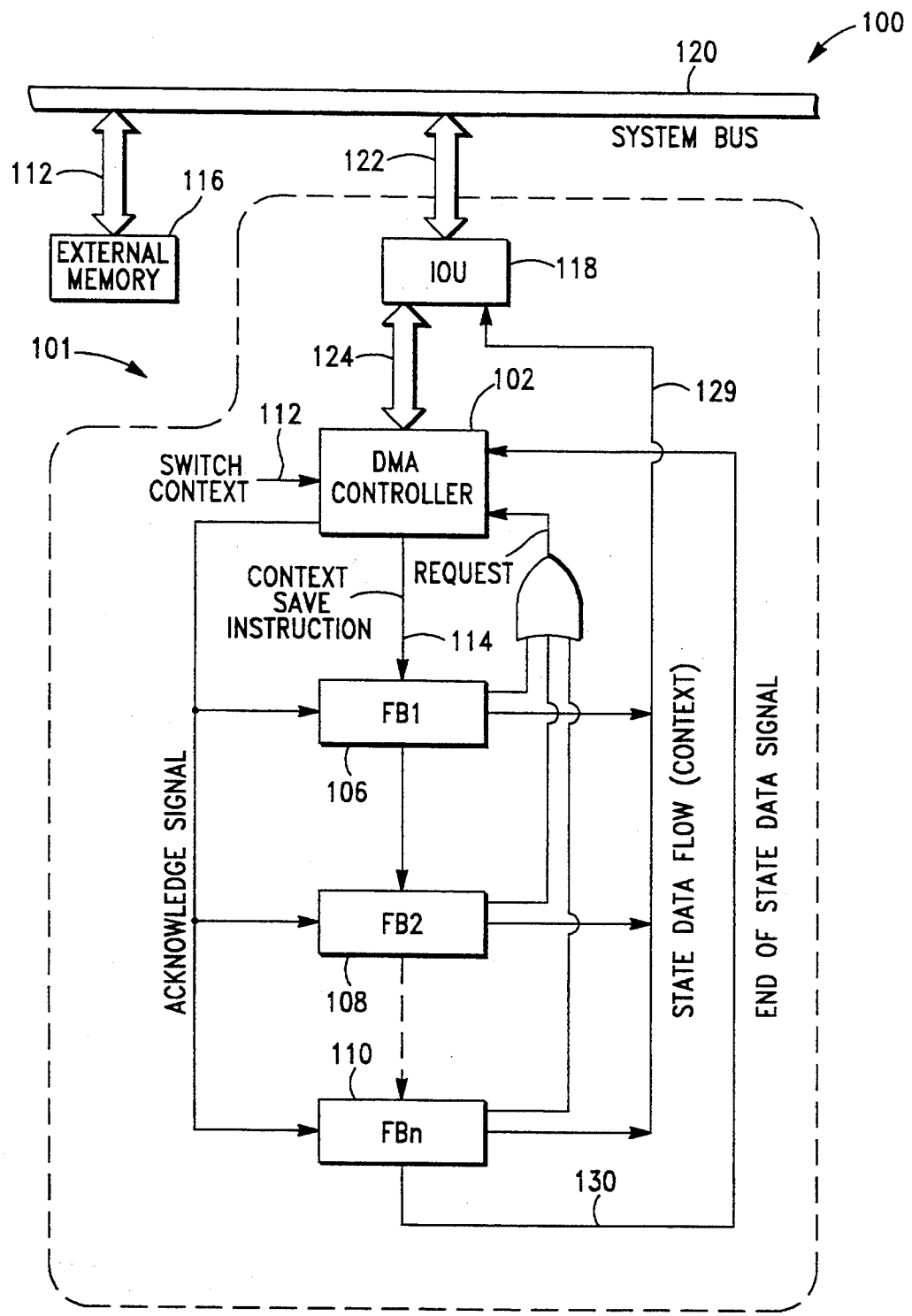
FIG. 1 is a high level block diagram of an automatic context switching system of the present invention.

A high level block diagram of an automatic context switching system 100 of the present invention is shown in FIG. 1. A processor is shown generally at 101. The processor comprises a DMA controller 102, an input/output unit (IOU) 118 and a functional block pipeline (FB1, FB2 through FBn shown at 106, 108 and 110, respectively). Functional blocks (also called microcoded units) 106–110 are used to perform specific tasks. In a 3-D graphics processing system, for example, functional blocks 106–110 perform tasks such as coordinate transformation, vector normalization, clipping, lighting, or the like.

A hardware data buffer called a context queue (not shown) resides in IOU 118. The context queue may alternatively be a separate block or may reside in another part of processor 101, as will become evident to those skilled in the art.

IOU 118 interfaces with an external system bus 120 via a bidirectional I/O bus 122. IOU 118 connects external system bus 120 to an internal data bus 124 that is connected to DMA 102. A external memory bus 121 connects external memory 116 to bus 120.

DMA 102 supervises all transactions between the context switching system and the outside world. DMA 102 has three main functions: (1) it controls the transfer of data to/from memory, (2) controls the flow of instructions down to the internal functional blocks, and (3) synchronizes context switch operations. The DMA functions could be implemented in other ways, such as distributing them to the functional blocks.

IOU 118 includes a command/status register (CSR; not shown). The CSR is externally accessible by the processor (system software), as well as by register load instructions. The processor can generate interrupts based on specific status conditions. The status conditions are stored as two bits in the CSR based on processor events. These bits are set or reset by hardware. A context switch operation is initiated (in both cases) by setting the proper bits in the CSR. As a representative example: when a save bit is set a context save is signaled; when a restore bit is set a context restore is signalled; and when both bits are set a context switch is signalled. The choice of two CSR bits is implementation specific. The important aspect of the CSR is that the hardware be provided with the correct commands. A more general command structure is also appropriate. Other equivalent techniques for signalling the status conditions will become evident to those skilled in the art.

The combination of the internal state data of the functional blocks and the content of the DMA comprises the "context" of the processor at a given instant.

The context of the functional block pipeline may be copied, and restored from "context data buffers" in memory where it is stored as a "state program" when not in use. DMA 102 contains pointers to memory 116 that are used for fetching instructions, data or for context switching.

The two pointers inside the DMA determine the boundaries of the context data buffers. These are called the "save" and "end" pointers. Two further pointers inside the DMA are used during instruction fetches. System software controls the amount of time the processor spends on each task. Because it manages the tasks, the system software updates a "write pointer". The write pointer indicates to the system software where in memory to add the new instructions. The DMA updates a "fetch pointer". The fetch pointer tells the DMA where to take the next instruction. For a more detailed description of the fetch pointer see commonly owned, co-pending application titled "Virtual FIFO Peripherals Interface", Ser. No. 07/862,623, filed Mar. 31, 1992, the disclosure of which is incorporated herein by reference.

A state program is a data structure comprising a series of register load instructions and data. Executing a state program will restore the values that were in the registers previous to the corresponding save. Each functional block builds its own state program and transfers it to the memory via the IOU under control of the DMA.

The exact order and contents of the context data buffers may be dependent on microcode (if used) and hardware implementation. It is not required that the context information be portable from implementation to implementation, because the context information is transient. This transient information is used only with in the specific system and only for a limited period of time. The context is not saved with the intention of reusing the context with different hardware. The exact size, contents and order may depend on the hardware and microcode versions and the current graphic operation being performed. Using microcode to build a state program allows a great deal of flexibility. The size of the state program can be optimized by saving only the contents of the important state registers, for example.

The DMA determines when an acceptable point in the current data stream has been reached prior to servicing a context operation. In the present graphics processor case, a functional block can not be interrupted in the middle of an instruction operation when all the data needed to complete the instruction has not been received by the functional block. The DMA keeps track of the number of data words being transferred; thus, it knows when to interrupt the flow.

A Context Area Base Pointer (CABP) register in DMA 102 holds the base address (least significant word) of a context data buffer in the memory used to save the current state (as a state program). A Context Restore Base Pointer (CRBP) register in DMA 102 holds the address of the context data buffer that stores the state program data used to restore the state. The CABP and CRBP registers remain unmodified after context saves, restores or switches in the current implementation. The system software manages these two pointers.

If the CSR is loaded with a RESTORE command, restore is accomplished by fetching the state program from memory starting at the location pointed to by the CRBP register. If both the SAVE and RESTORE bits are set, the processor first saves its state and then restores it using CABP and CRBP, respectively.

If the chip is currently executing an instruction stream, the hardware will continue to process the instruction stream until an acceptable interruption point is reached and then proceed. Acceptable interruption points will be defined by the specific implementation of processor hardware, firmware, system software, or the like.

In response to a context switch instruction or interrupt signal, DMA 102 sends a "ContextSave" instruction along a bus 114 to the first functional block 106. Functional block 106's builds its own state program and transfers it to the memory via a bus 129 and the IOU 118 with the assistance of the DMA.

Once functional block 106 has transferred all of its state data, the ContextSave instruction is sequentially passed to the next functional block 108, and so on, until the last functional block 110 has transferred all of its data.

A "load" instruction (such as a load immediate instruction) is stored along with the state data when the functional block passes the state data. One load instruction is sufficient to load contiguous registers in the current implementation. Each load instruction is coded so that when its corresponding state data is eventually read from memory 116, that load instruction will be executed by the functional block to store its corresponding state data in the correct location(s) within the correct functional block. As will become evident to those skilled in the art, the load instruction must be coded with the address of the register, or the like, in the corresponding functional block.

The last functional block 110 sends an end-of-state-data signal 130 to the DMA when it completes forwarding its state data. For convenience, the DMA then saves its state after all the functional blocks. For hardware simplicity, the last instruction saved is an "end of restore" instruction. This instruction indicates to the DMA the end of a restore operation. DMA 102 then restores the next state of the processor as specified by the Switch Context interrupt or instruction. Alternatively, the DMA can determine the end of the restore operation by decoding a specific address. Also, the DMA can store its information at the beginning of the process and include in it a total word count. A further technique for synchronizing the end of the restore operation is to add another register that identifies the number words in a state. The DMA controller would use this register's information to determine the end of the restore operation.

The operation for restoring a previously stored state of the processor is appropriately called a "restoring operation". The restoring operation is very straight forward and comprises fetching and executing a state program from a context data buffer in memory 116 where the desired state data is stored, rather that from the context queue.

In a preferred embodiment of the present invention, the state save operation is done serially, one functional block at a time. This serial transfer of the ContextSave instruction reduces system complexity. Other non-serial approaches may require additional hardware and software. Such approaches utilizing a stored program and load instructions, or the like, are considered to be within the scope and spirit of the present invention.

Figure 2A:
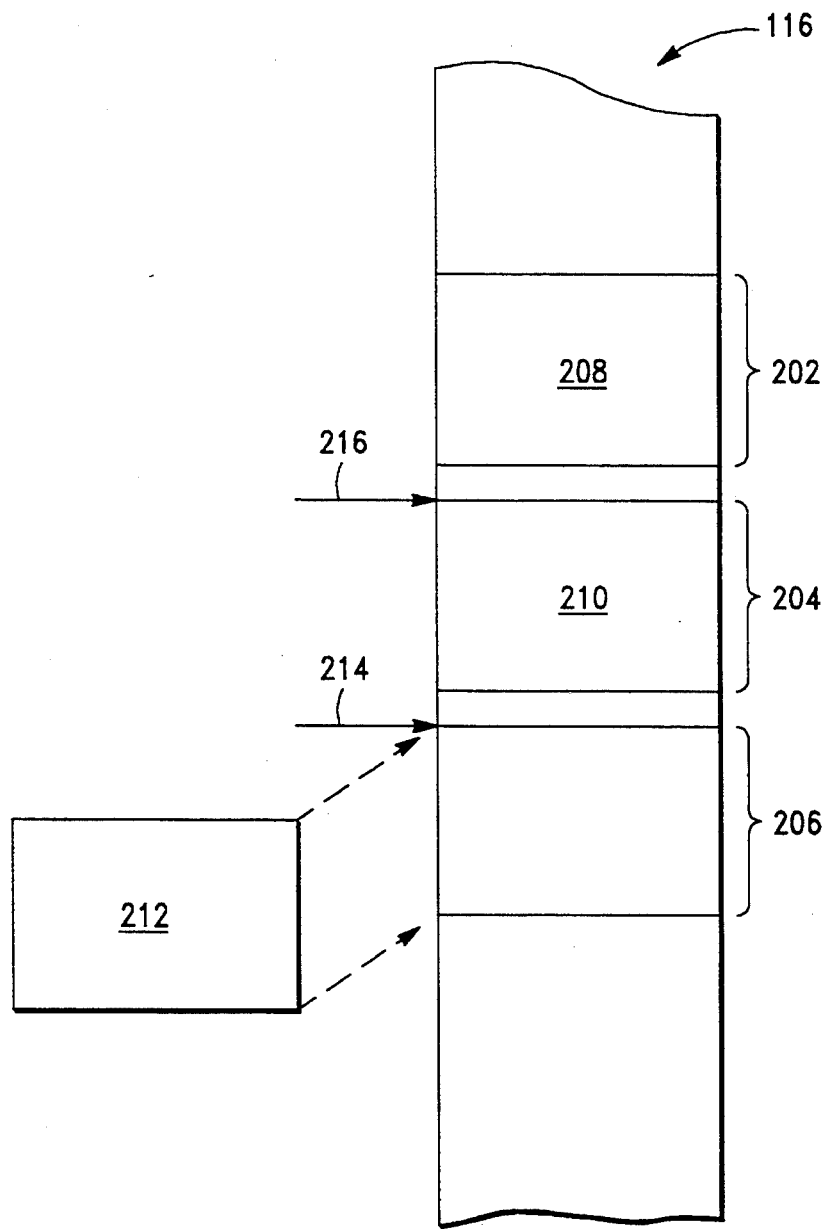

FIG. 2 shows representative context data buffers 202, 204 and 206 of memory that are designated to store groups of state blocks forming state programs 208, 210 and 212, respectively, in accordance with the system of FIG. 1. (State blocks will be still further described in conjunction with FIG. 3 below.) Each state program corresponds to the processor context. CABP pointer 214 points to context data buffer 206 in a section of memory 116 allocated to receive state program 212. Each state program comprises the sequential ordering of one or more load instructions and corresponding state data from the functional block pipeline pertaining to a particular context. A CRBP pointer 216 points to the beginning of context data buffer 204 containing state program 210. State program 210 is sent to DMA 102 and executed to restore a previous context or predetermined context configuration, necessary for performing some task.

The context data buffers need not be contiguous, nor do separate state programs need be stored in a particular address order in memory. As long as the system software keeps track of the beginning address of each context data buffer, the contexts of the corresponding state program can be easily switched into and out of the functional block pipeline.

The format in which the data is saved enables a fast automatic restore operation. Each state program comprises all the necessary information to restore the context to the functional blocks. The restore operation simply requires the execution of a state program, which comprises a series of register load instructions and data.

External memory usage is also envisioned. The multitasking processor can use the memory in the system memory area. This data may be organized in memory blocks. The host allocates the memory and places a pointer in the DMA controller which points to an extended state memory block so that the microcode can make use of that area as a stack, or for overflow storage of data, for example. In principle, multiple memory blocks can be allocated to a context.

Two representative illustrations of external memory usage are shown in FIGS. 2B and 2C. Referring to FIG. 2B, a memory block showing state programs 208 and 210 also includes respective extended state memory blocks 208' and 210'. In this embodiment of extended memory usage, the extended state memory blocks 208' and 210' are contiguous. FIG. 2C shows extended state memory blocks 208" and 210" stored in memory locations that are separate from their respective state programs 208 and 210.

An additional feature of the present invention is that the CSR can be loaded by the normal instruction stream. This feature permits a context switch or interrupt to be generated at the end of the stream causing the context of the stream to be switched-out or eliminated.

The present invention can be extended to support conditional context switching. For example, a conditional context switch could be initiated when the DMA's data buffer is empty.

FIG. 3 shows a state block 300. State block 300 comprises register load instruction 302 for register A. Load instruction 302 is followed by information 304 indicating that a total of N data words correspond to that load instruction. The remaining blocks 306 represent the N data words. Other arrangements using the load instruction technique are possible. Context is stored in state blocks as a contiguous state program for ease of implementation and to minimize hardware and software overhead. However, different storage techniques and hierarchy may be employed without deviating from the scope of the present invention.

The context is not necessarily the entire set of registers in the functional blocks. For example, the contents of working registers used by a functional block to perform intermediate tasks need not be saved, because the functional block might not need all the registers' information to accomplish the specified task. Each functional block may be microcoded, controlled by a state machine, or is otherwise configured, to provide a context saving mechanism or means. Thus, each functional block is aware of the task it is performing and therefore can determine when it can switch context, and what data it needs to save in order to switch back to that task at a later time for continuation and complete it.

One advantage of this method is that each functional block can decide which registers to save. The order of the data has also little importance. If a block has internal microcode for example, the microcode can be tailored to optimize the number of registers to save.

Figure 4:
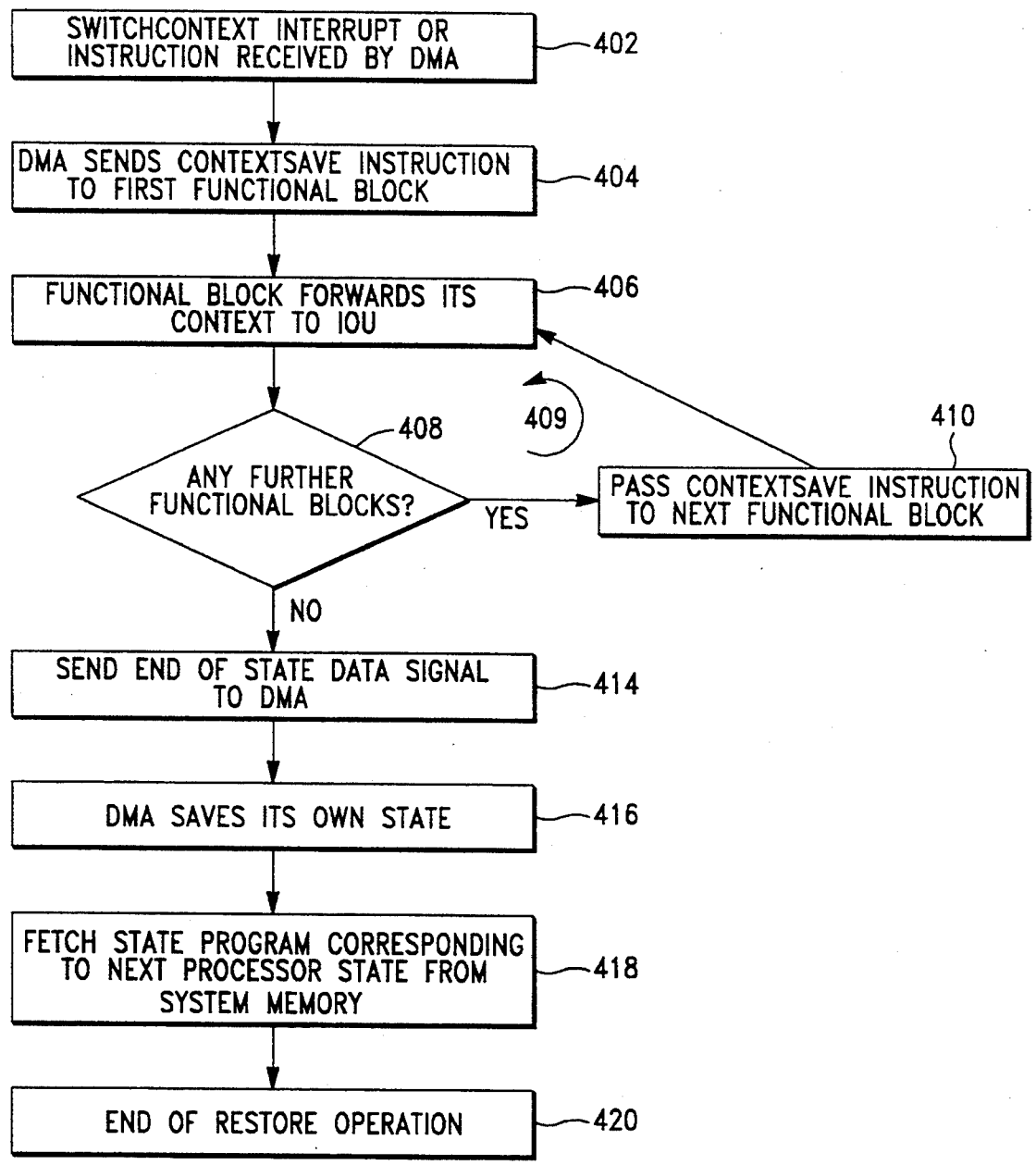
FIG. 4 is a representative flow chart of the context switching method of the present invention.

FIG. 4 shows a representative flow chart of the context switching method of the present invention.

First, a SwitchContext interrupt signal or instruction is received by DMA 102, as shown at block 402. DMA 102 then sends a ContextSave instruction to functional block 106, which then forwards its context IOU 118, as shown at blocks 404 and 406, respectively. Conditional statement block 408 and blocks 410 and 406 diagrammatically represent the serial passing of the ContextSave instruction to the remaining functional blocks. At block 410 the ContextSave instruction is actually passed to the next functional block.

Once all the functional blocks have passed their context to the IOU, as represented by the "NO" condition at block 408, the end of state data signal is sent to DMA 102, as shown at block 414. DMA 102 then stores its context, as shown at block 416. Finally, the requested state program is fetched from a context data buffer in memory and processed, as shown at block 418. The "end of restore" instruction is then processed, as shown at block 420. Normal processing of instructions from the control queue then resumes.

While various embodiments of the present invention have been described above, it should be understood that they have been presented by way of example, and not limitation. Thus the breadth and scope of the present invention should not be limited by any of the above-described exemplary embodiments, but should be defined only in accordance with the following claims and their equivalents.

What is claimed is:

1. A method for saving, restoring and switching tasks, in a context switching system adapted for use in a multitasking processor coupled to a memory and having one or more functional blocks to perform the tasks, the functional blocks having registers, wherein the registers store state data that, at a particular instant, represents the context of the system, comprising the steps of:

(1) receiving, in a control means, one of a save command, switch command and an interrupt signal, and generating a context save instruction in response thereto;

(2) passing said context save instruction to one or more of the functional blocks, said passing performed by the control means;

(3) receiving said context save instruction at the one or more functional blocks;

(4) generating a state program, said state program comprising one or more register load instructions and the state data representing the context of the system so that context can be restored at a later time, said generating step performed by the one or more functional blocks;

(5) temporarily storing said state program in a context queue, said storing step performed by the one or more functional blocks; and (6) transferring said state program from said context queue to a context data buffer area in the memory.

2. The method according to claim 1, wherein in step 5 the control means performs the step of:

providing a context area base pointer to specify a base address for said context data buffer where said state program is to be stored in memory.

3. The method according to claim 1, further comprising the step of:

serially passing said context save instruction from one functional block to the next; and wherein the state data of a particular functional block is first forwarded to said context queue before said context save instruction is passed to the next functional block.

4. A method for restoring a state program in a context switching system adapted for use in a multitasking processor coupled to a memory and having one or more functional blocks to perform the tasks, the functional blocks having registers, wherein the registers store state data that, at a particular instant, represents the context of the system, comprising the steps of:

receiving a restore instruction;

fetching, in response to said restore instruction, a state program from a context data buffer in the memory by using a context restore base pointer that specifies the address in the memory of said predetermined context data buffer, the state program comprising state blocks having register load instructions and state data to be stored in functional block registers specified by the register load instructions; and executing the register load instructions of the state program to restore the functional blocks to a predetermined context.

* * * * *